US012771033B2

(12) United States Patent
Hasnat et al.

(10) Patent No.: US 12,771,033 B2
(45) Date of Patent: Oct. 20, 2026

(54) ELECTRONIC DEVICE WITH CAPACITIVELY FED DISPLAY ANTENNA

(71) Applicant: Apple Inc., Cupertino, CA (US)

(72) Inventors: Forhad Hasnat, Milpitas, CA (US); Subramanian Ramalingam, San Jose, CA (US); Zhe Zhang, Santa Clara, CA (US); Harish Rajagopalan, San Jose, CA (US); Piotr S Trzaskos, Austin, TX (US); Kourosh R Khanjani, Los Gatos, CA (US); Joonas I Ponkala, San Carlos, CA (US); David Garrido Lopez, Alviso, CA (US); Panagiotis Theofanopoulos, Cupertino, CA (US); Paula Fernandez Martinez, Gijón (ES); Jibi Jose Mathew, Cedar Park, CA (US); Alden Fisher, Austin, TX (US); Charles A Lynch, Austin, TX (US); Rodney A Gomez Angulo, Santa Clara, CA (US); Carlo Catalano, Santa Cruz, CA (US); James A Stryker, Campbell, CA (US); Melody L Kuna, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 18/630,854

(22) Filed: Apr. 9, 2024

(65) Prior Publication Data

US 2025/0316904 A1 Oct. 9, 2025

(51) Int. Cl.

*H01Q 1/44* (2006.01)
*H01Q 1/24* (2006.01)

(Continued)

(52) U.S. Cl.

CPC ............ *H01Q 9/045* (2013.01); *H01Q 1/243* (2013.01); *H01Q 1/48* (2013.01)

(58) Field of Classification Search

CPC .......... H01Q 9/045; H01Q 1/243; H01Q 1/48; H01Q 1/44

See application file for complete search history.

(56) References Cited

U.S. PATENT DOCUMENTS

| | | | | |
|---|---|---|---|---|
| 10,734,708 B2 | 8/2020 | Young et al. | | |
| 11,228,345 B1 * | 1/2022 | Wang | ........................ | H04B 5/24 |

(Continued)

*Primary Examiner* — Dameon E Levi
*Assistant Examiner* — Bamidele A Immanuel
(74) *Attorney, Agent, or Firm* — Treyz Law Group, P.C.; Michael H. Lyons

(57) ABSTRACT

An electronic device may be provided with sidewalls, a rear wall, and a display mounted to the sidewalls opposite the rear wall. The device may include an antenna integrated into the display. The antenna may include a resonating arm formed from a first conductive layer in the display. The first conductive layer may be layered onto a dielectric layer of the display. The antenna may be fed using a feed patch layered onto the dielectric layer. The feed patch may indirectly feed the first conductive layer via a first capacitive coupling across the dielectric layer. The antenna may have a return path that includes a second conductive layer on the dielectric layer. The second conductive layer may convey radio-frequency current between the first conductive layer and the rear wall via a second capacitive coupling across the dielectric layer.

20 Claims, 9 Drawing Sheets

(51) Int. Cl.
*H01Q 1/48* (2006.01)
*H01Q 9/04* (2006.01)

(56) References Cited

U.S. PATENT DOCUMENTS

| | | | | |
|---|---|---|---|---|
| 2010/0321325 | A1* | 12/2010 | Springer | H01Q 1/243 345/173 |
| 2011/0298670 | A1* | 12/2011 | Jung | H01Q 1/243 343/702 |
| 2012/0050114 | A1* | 3/2012 | Li | H01Q 1/243 343/702 |
| 2012/0087065 | A1* | 4/2012 | Kim | H04B 15/02 361/679.01 |
| 2014/0045424 | A1* | 2/2014 | Fratti | H01Q 1/44 343/866 |
| 2016/0056527 | A1* | 2/2016 | Pascolini | H01Q 1/48 343/702 |
| 2017/0309995 | A1* | 10/2017 | Kim | H01Q 1/243 |
| 2019/0081386 | A1* | 3/2019 | Edwards | H01Q 5/328 |
| 2019/0081394 | A1* | 3/2019 | Edwards | H04M 1/0266 |
| 2019/0097306 | A1* | 3/2019 | Romano | H01Q 13/10 |
| 2019/0207319 | A1* | 7/2019 | Wu | H01Q 5/357 |
| 2020/0006842 | A1* | 1/2020 | Zhu | H01Q 5/378 |
| 2020/0021008 | A1* | 1/2020 | Yong | H01Q 21/005 |
| 2020/0119439 | A1* | 4/2020 | Edwards | H01Q 9/42 |
| 2021/0135378 | A1* | 5/2021 | Cho | H01Q 1/2283 |
| 2022/0336965 | A1* | 10/2022 | Compton | H01Q 1/243 |
| 2023/0291124 | A1* | 9/2023 | Ayala Vazquez | H01Q 1/243 |
| 2024/0079757 | A1* | 3/2024 | Amjadi | H01Q 1/243 |
| 2024/0079766 | A1* | 3/2024 | Xu | H01Q 5/328 |

* cited by examiner

ELECTRONIC DEVICE WITH CAPACITIVELY FED DISPLAY ANTENNA

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures. At the same time, there is a desire for wireless devices to cover a growing number of communications bands. In addition, to optimize user experience, it is often desirable for the viewing area of a display in an electronic device to be as large as possible.

Because antennas have the potential to interfere with each other and with components in a wireless device such as displays, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth while still allowing the device to exhibit a compact form factor.

SUMMARY

An electronic device may be provided with wireless circuitry and a housing. The housing may include peripheral conductive housing structures and a conductive wall. The electronic device may include a display mounted to the peripheral conductive housing structures opposite the conductive wall.

The wireless circuitry may include a capacitively fed antenna integrated into the display. The antenna may have an antenna resonating element arm formed from a conductive layer of the display. The conductive layer may be layered onto a dielectric layer of the display. The conductive layer may include thin film transistors, organic light emitting diode (OLED) circuitry, touch sensor electrodes, and/or other display circuitry. The antenna may include a feed patch layered onto the dielectric layer. The feed patch may indirectly feed the antenna resonating element arm via a first capacitive coupling across the dielectric layer. The antenna may include an additional conductive layer on the dielectric layer. The additional conductive layer may convey radio-frequency current between the antenna resonating element arm and the conductive wall via a second capacitive coupling across the dielectric layer.

DETAILED DESCRIPTION

Figure 1:
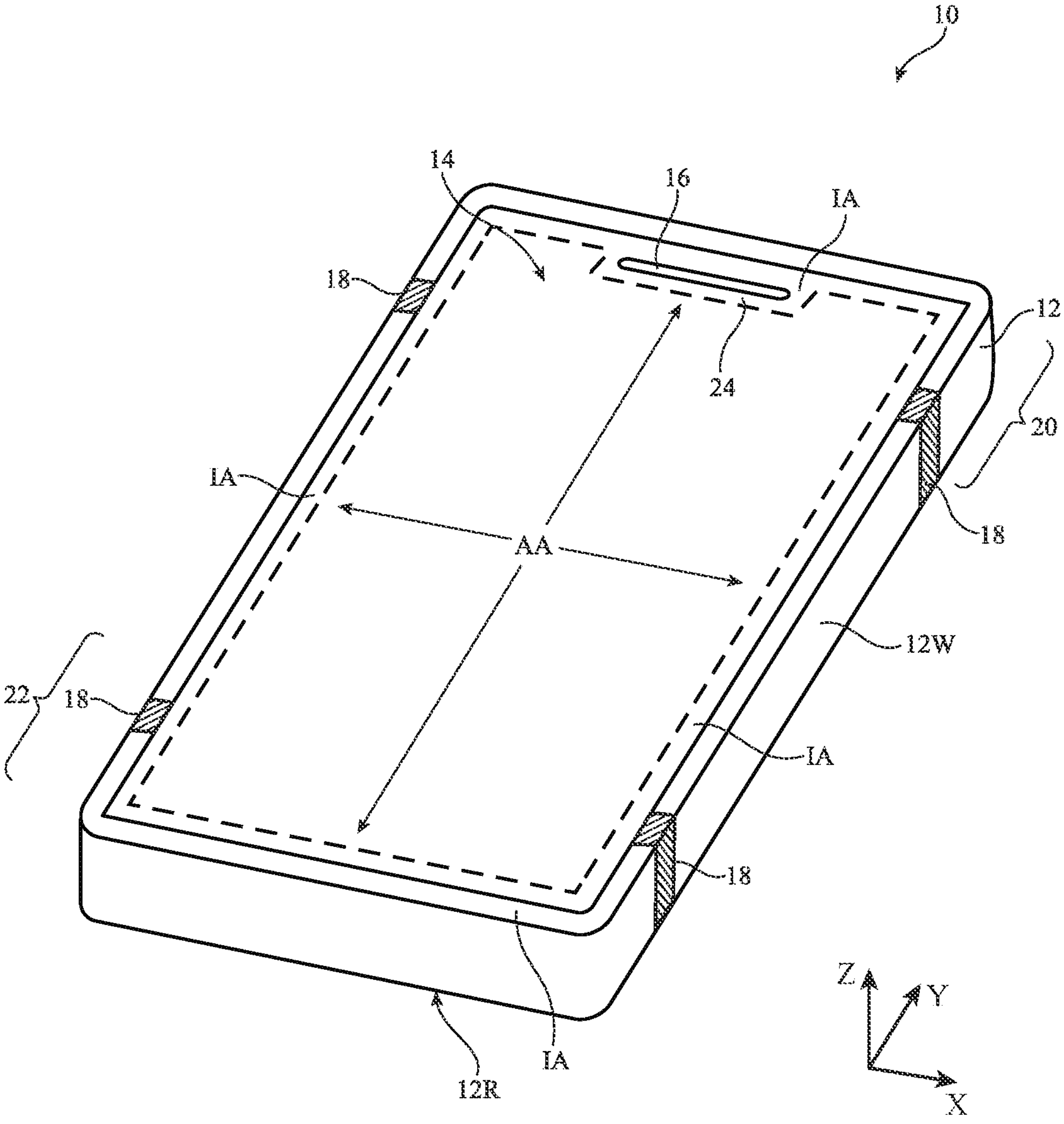
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, include a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (e.g., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. Alternatively, notch 24 may be defined on all sides by (e.g., may be surrounded and enclosed by) active area AA (e.g., notch 24 may form an inactive island in the pixel circuitry of display 14). One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any desired number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
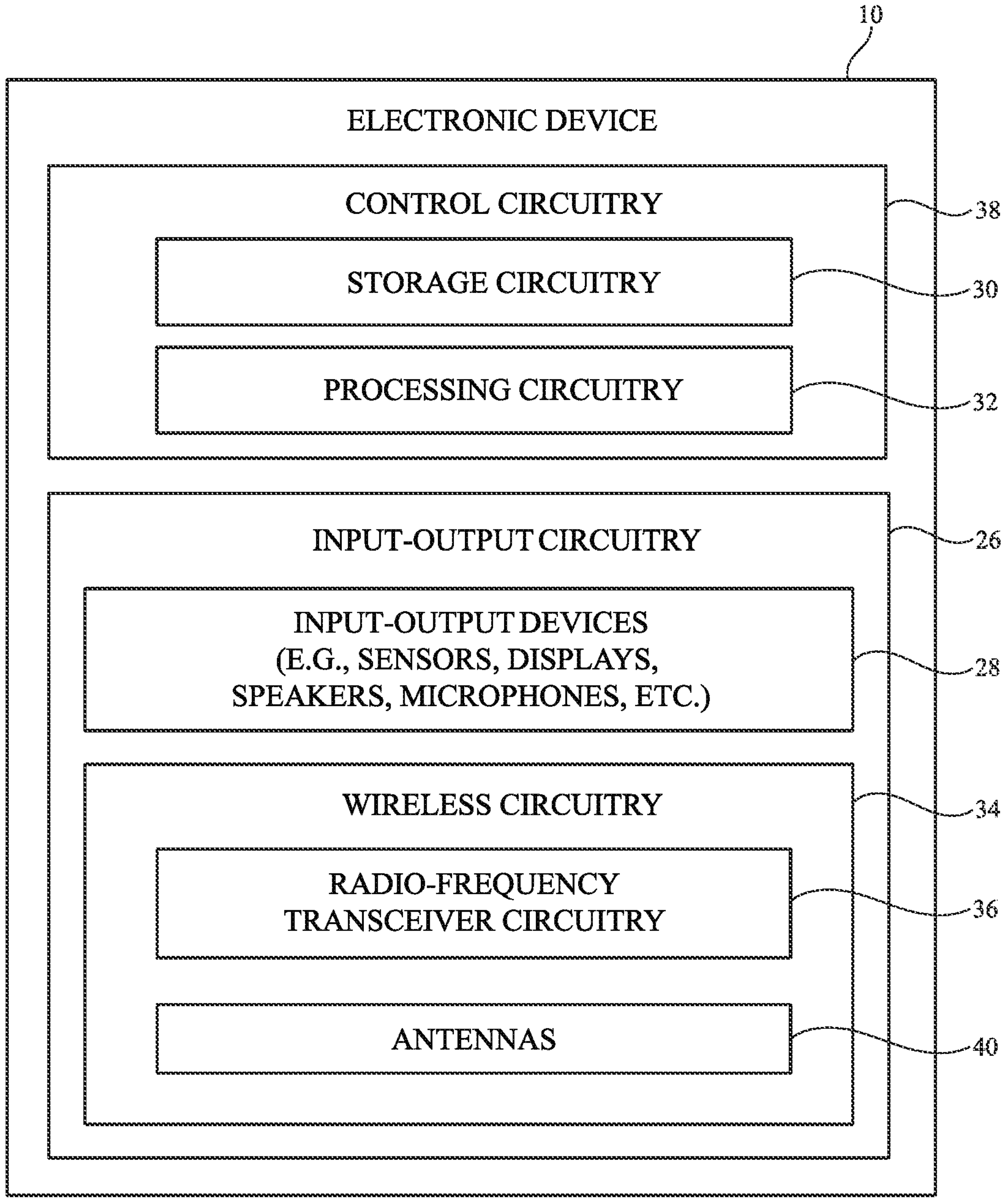
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHZ), a 5 GHZ WLAN band (e.g., from 5180 to 5825 MHZ), a Wi-Fi® 6E band (e.g., from 5925-7125 MHz), and/or other Wi-Fi® bands (e.g., from 1875-5160 MHZ), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHZ), 3G bands, 4G LTE bands, 3GPP 5G New Radio Frequency Range 1 (FR1) bands below 10 GHZ, 3GPP 5G New Radio (NR) Frequency Range 2 (FR2) bands between 20 and 60 GHz, other centimeter or millimeter wave frequency bands between 10-300 GHz, sub-THz bands (e.g., 3GPP 6G bands) between around 100 GHz and 1 THz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHZ), L4 band (e.g., at 1380 MHz), and/or L5 band (e.g., at 1176 MHZ), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHZ and/or a second UWB communications band at 8.0 GHZ), communications bands under the family of 3GPP wireless communications standards, communications bands under the IEEE 802.XX family of standards, satellite communications bands such as an L-band, S-band (e.g., from 2-4 GHZ), C-band (e.g., from 4-8 GHZ), X-band, Ku-band (e.g., from 12-18 GHZ), Ka-band (e.g., from 26-40 GHz), etc., industrial, scientific, and medical (ISM) bands such as an ISM band between around 900 MHz and 950 MHz or other ISM bands below or above 1 GHZ, one or more unlicensed bands, one or more bands reserved for emergency and/or public services, and/or any other desired frequency bands of interest. Wireless circuitry 34 may also be used to perform spatial ranging operations if desired.

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna (IFA) structures, slot antenna structures, planar inverted-F antenna (PIFA) structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
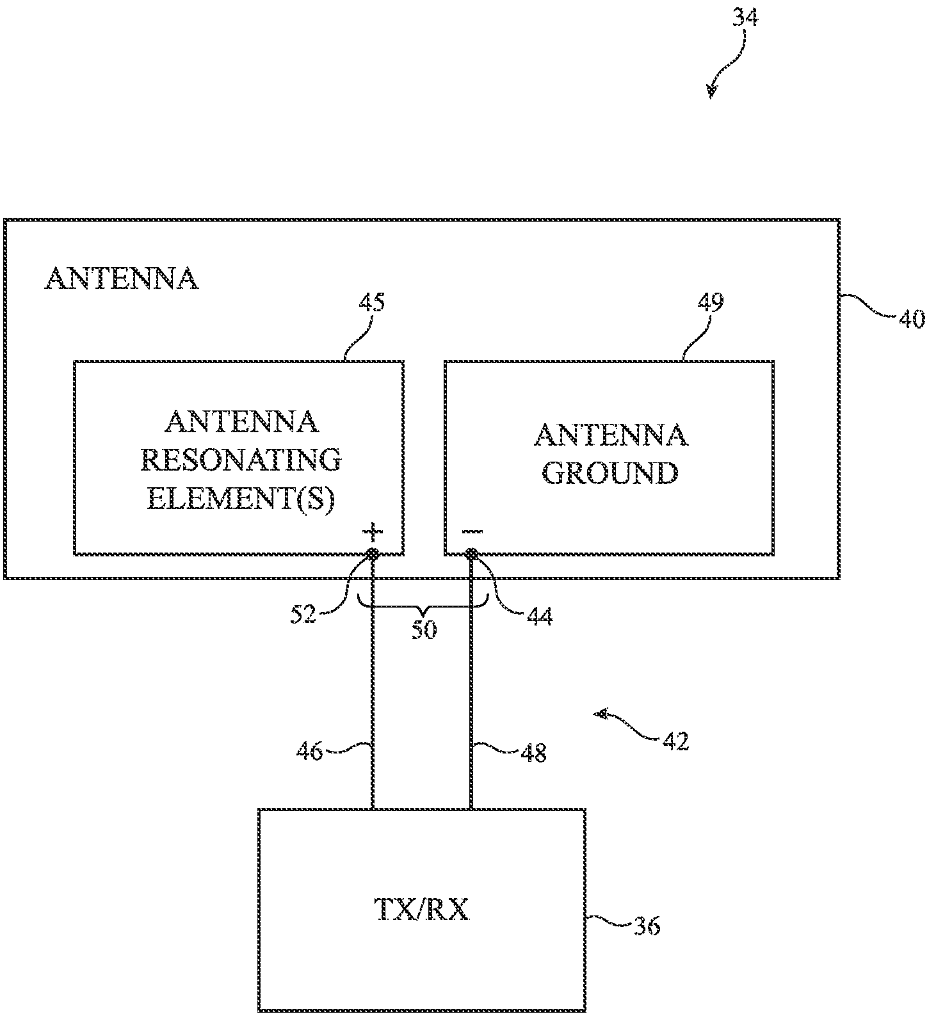
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
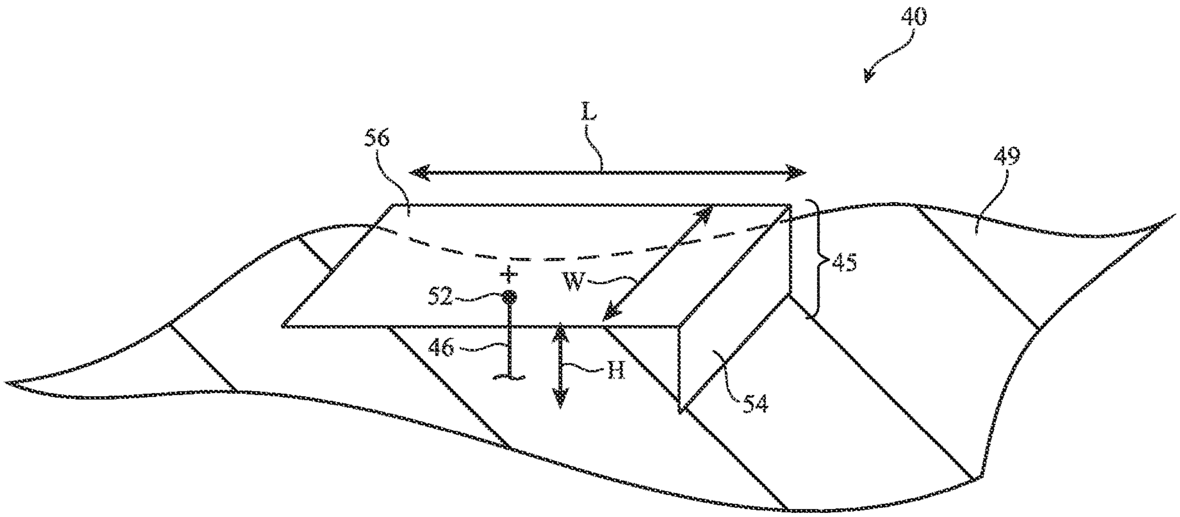
FIG. 4 is a schematic diagram of an illustrative antenna having a directly fed planar inverted-F antenna resonating element in accordance with some embodiments.

In general, antenna 40 may be implemented using any desired antenna architecture. In some implementations that are described herein as an example, antenna 40 may be implemented using a PIFA architecture (e.g., antenna 40 may be a planar inverted-F antenna). FIG. 4 is a schematic perspective view showing one example of how antenna 40 may be implemented using a PIFA architecture.

As shown in FIG. 4, the antenna resonating element 45 of antenna 40 may include a resonating element arm such as antenna arm 56. Antenna arm 56 is sometimes also referred to herein as antenna element 56, arm 56, radiating element 56, radiating arm 56, radiating element arm 56, or PIFA arm 56. Antenna arm 56 may extend across a two-dimensional lateral area and may overlap antenna ground 49 (e.g., antenna arm 56 and antenna ground 49 may lie in substantially parallel planes). The signal conductor 46 of the transmission line path 42 (FIG. 3) for antenna 40 may be coupled to antenna arm 56 at positive antenna feed terminal 52.

When implemented as a PIFA arm, antenna arm 56 may be electrically coupled (shorted) to antenna ground 49. For example, antenna arm 56 may extend from a first edge to an opposing second edge. The first edge may be shorted to antenna ground 49 by return path 54. The dimensions of antenna arm 56 may configure antenna 40 to radiate in one or more corresponding frequency bands. For example, antenna arm 56 may have a length L (e.g., measured from the first end to the second end of antenna arm 56) and an orthogonal width W. Length L and/or width W (e.g., the perimeter of antenna arm 56) may be selected to configure antenna 40 to radiate in a corresponding frequency band (e.g., in a fundamental mode and/or one or more harmonic modes). Antenna arm 56 may be substantially rectangular, may be square, or may be other shapes having any desired number of straight and/or curved edges. The location of positive antenna feed terminal 52 may be adjusted to impedance match signal conductor 46 to antenna 40 in the frequency band covered by antenna 40.

Figure 5:
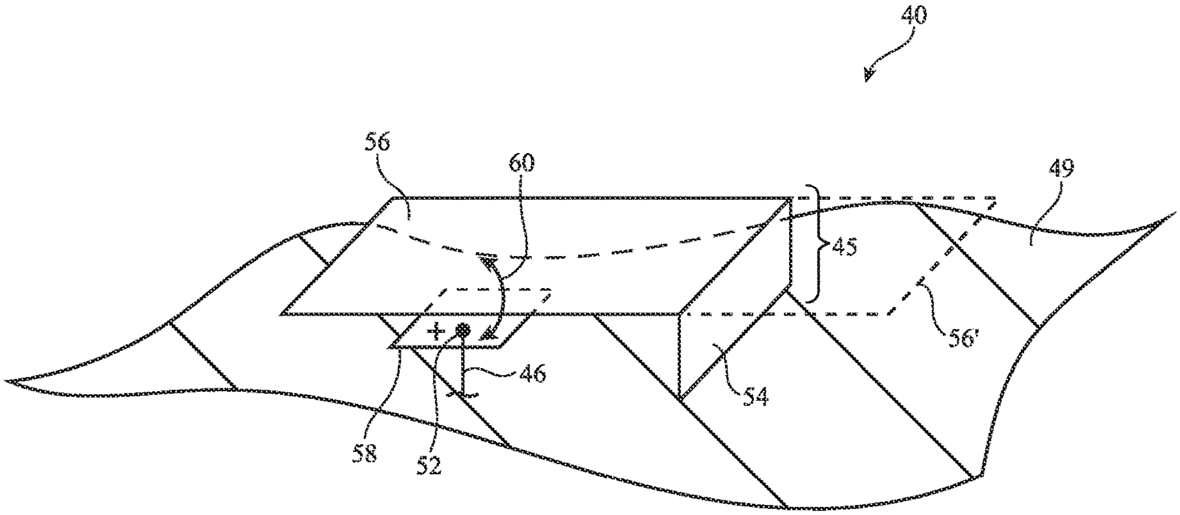
FIG. 5 is a schematic diagram of an illustrative antenna having a capacitively fed planar inverted-F antenna resonating element in accordance with some embodiments.

In the example of FIG. 4, antenna arm 56 is directly fed by signal conductor 46. Put differently, signal conductor 46 is directly (e.g., galvanically) connected to antenna arm 56 at positive antenna feed terminal 52. If desired, antenna arm 56 may be indirectly fed by a separate feed conductor. FIG. 5 is a schematic perspective view showing one example of how antenna arm 56 may be indirectly fed using a feed conductor.

As shown in FIG. 5, antenna 40 may include a feed conductor such as feed patch 58. Antenna arm 56 may overlap feed patch 58. Feed patch 58 may be a patch of metal (e.g., a patch element) or another conductor that is vertically interposed between antenna arm 56 and antenna ground 49. Feed patch 58 may, for example, be a two-dimensional metal patch that lies in a plane parallel to antenna arm 56 and/or antenna ground 49. Feed patch 58 may be vertically separated from the overlying antenna arm 56 by a dielectric-filled gap. This separation may establish a capacitance (e.g., a capacitive coupling) between feed patch 58 and antenna arm 56. The shape/dimensions of feed patch 58 and/or the separation between feed patch 58 and antenna arm 56 may be selected to produce a desired capacitance between feed patch 58 and antenna arm 56.

Signal conductor 46 may be coupled to feed patch 58 at positive antenna feed terminal 52 (e.g., signal conductor 46 may be galvanically connected to feed patch 58 but is not galvanically or directly connected to antenna arm 56). Feed patch 58 may indirectly feed antenna arm 56 via near-field electromagnetic (e.g., capacitive) coupling 60. During signal transmission, antenna current flows from signal conductor 46 onto feed patch 58 via positive antenna feed terminal 52. The antenna current on feed patch 58 flows around the edges of feed patch 58 and induces, via near-field electromagnetic coupling 60, a corresponding antenna current that flows around the perimeter of antenna arm 56. The antenna current on antenna arm 56 radiates corresponding radio-frequency signals into free space. During signal reception, incident radio-frequency signals produce antenna current around the perimeter of antenna arm 56. This antenna current induces, via near-field electromagnetic coupling 60, a corresponding antenna current that flows around the perimeter of feed patch 58. The antenna current is then passed onto signal conductor 46 via positive antenna feed terminal 52.

Feed patch 58 is sometimes also referred to herein as feed element 58, feed probe 58, capacitive feed patch 58, capacitive feed conductor 58, feed electrode 58 (e.g., feed patch 58 and antenna arm 56 effectively form opposing electrodes of a capacitor), indirect feed element 58, indirect feed patch 58, indirect feed 58, or capacitive feed 58. When indirectly fed, antenna arm 56 is sometimes also referred to herein as capacitively fed antenna arm 56 or indirectly fed antenna arm 56. Feed patch 58 may have a square shape, a rectangular shape, or any other desired shape having any desired number of straight and/or curved edges.

If desired, antenna 40 may include one or more additional antenna arms such as antenna arm 56'. Antenna arms 56 and 56' may extend from opposing sides of return path 54. Alternatively, antenna arm 56' may extend from an end of antenna arm 56 opposite return path 54. Antenna arm 56' may, for example, configure antenna 40 to cover one or more additional frequency bands in addition to the frequency band(s) covered by antenna arm 56. The examples of FIGS. 4 and 5 are illustrative and, in general, antenna 40 may be implemented using any desired antenna architecture (e.g., antenna arm 56 may be replaced with a monopole arm, a dipole arm, an inverted-F antenna arm, a patch antenna resonating element that is not shorted to antenna ground 49, a slot antenna resonating element, etc.).

Figure 6:
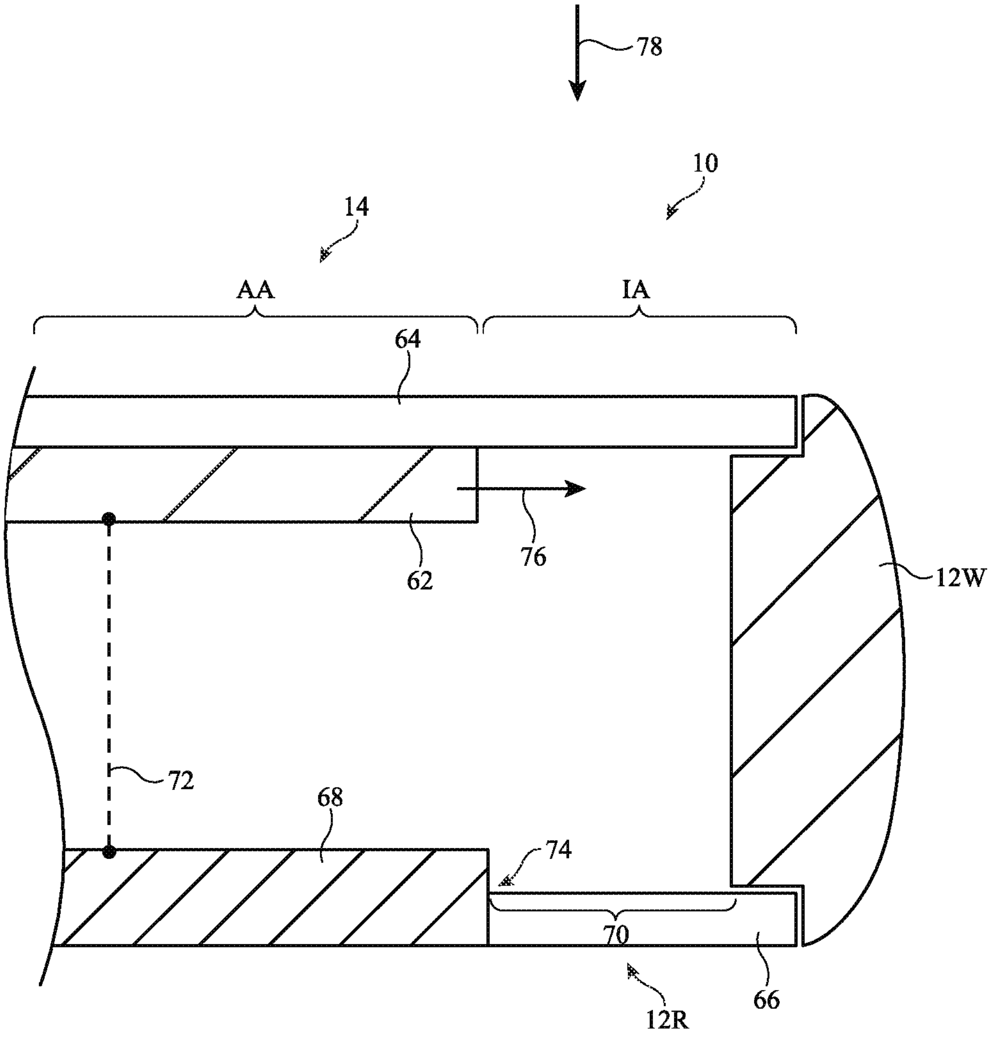
FIG. 6 is a cross-sectional side view of an electronic device having conductive display structures that may be used in forming antenna structures in accordance with some embodiments.

If desired, conductive electronic device structures such as conductive portions of housing 12 and display 14 (FIG. 1) may be used to form at least part of one or more of the antennas 40 in device 10. FIG. 6 is a cross-sectional side view of device 10, showing illustrative conductive electronic device structures that may be used in forming one or more of the antennas 40 in device 10.

As shown in FIG. 6, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4.

Display 14 may have a display module such as display module 62 (sometimes referred to herein as display panel 62). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 6, rear housing wall 12R may be mounted to peripheral conductive housing structures 12W (e.g., opposite display 14). Rear housing wall 12R may include one or more conductive walls such as conductive wall 68 (sometimes also referred to herein as conductive support plate 68, conductive chassis 68, conductive housing wall 68, or conductive layer 68). If desired, the exterior surface of conductive wall 68 may be covered with a dielectric cover layer in rear housing wall 12R (not shown) or may be covered with one or more coatings (e.g., cosmetic coatings, antireflective coatings, oleophobic coatings, color coatings, protective coatings, masking layers, ink layers, etc.). If desired, conductive wall 68 and peripheral conductive housing structures 12W may be formed from different respective portions of a single integral piece of metal (e.g., in a unibody configuration of device 10). Alternatively, conductive wall 68 may be formed from a separate conductor than peripheral conductive housing structures 12W (e.g., to help facilitate removal of rear housing wall 12R from device 10).

Conductive wall 68 may extend across an entirety of the width of device 10 (e.g., between the left and right edges of device 10 as shown in FIG. 1). One or more components may be supported by conductive wall 68 (e.g., logic boards such as a main logic board, a battery, a speaker, a camera, a ringer or haptic engine, etc.). Conductive wall 68 may contribute to the mechanical strength of device 10 (e.g., to prevent external twisting or bending forces from damaging device 10). Conductive wall 68 may be formed from metal (e.g., stainless steel, aluminum, titanium, etc.), for example.

Conductive wall 68 may have an edge 74 that is separated from peripheral conductive housing structures 12W by dielectric-filled slot 70 (sometimes referred to herein as opening 70, gap 70, or aperture 70). Slot 70 may be filled with air or may be filled with dielectric 66 (e.g., plastic, ceramic, glass, or other dielectric materials). One or more conductive structures such as conductive interconnect structure 72 may electrically couple conductive wall 68 to conductive structures on and/or in display module 62.

Conductive interconnect structure 72 is sometimes also referred to herein as conductive interconnect 72, conductive structure 72, or vertical conductor 72. Conductive interconnect structure 72 may include a conductive trace, conductive pin, conductive spring (e.g., a y-spring or spring finger), conductive prong (e.g., conductive blades that mate with conductive spring fingers such as a y-spring), conductive bracket, conductive screw, conductive clip, conductive tape, conductive wire, conductive trace, conductive foam, conductive adhesive, solder, welds, metal members (e.g., sheet metal members), contact pads, conductive vias, a conductive portion of one or more components mounted to conductive wall 68, a conductive and/or dielectric pillar, standoff, or shim, a portion of a conductive wall, a portion of a conductive frame, and/or any other desired conductive interconnects.

Conductive wall 68, conductive portions of display module 62, and/or peripheral conductive housing structures 12W may be used to form antenna structures for one or more of the antennas 40 in device 10. At the same time, it may be desirable to laterally extend the edges of display module 62 as close to peripheral conductive housing structures 12W as possible (e.g., as shown by arrow 76, maximizing the viewable active area AA of display 14 while minimizing the inactive area IA of display 14). However, if care is not taken, the presence of conductive material in display module 62 can prevent device 10 from exhibiting satisfactory wireless performance in conveying radio-frequency signals within the hemisphere over the front face of device 10 (e.g., through display 14).

Figure 7:
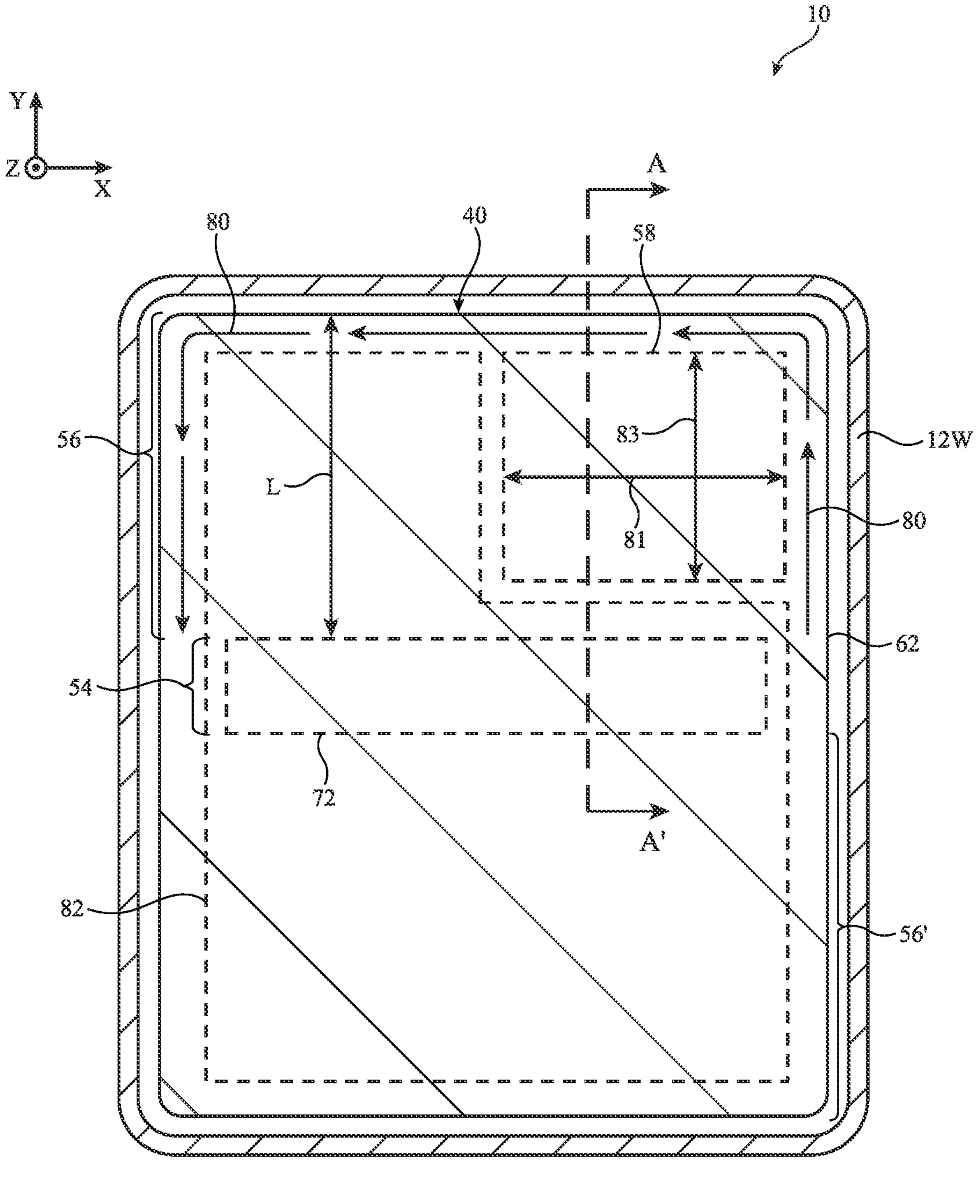
FIG. 7 is an interior top view of an illustrative electronic device having a capacitively fed display antenna in accordance with some embodiments.

To mitigate these issues and to provide display 14 with as large an active area AA as possible while also allowing device 10 to also exhibit satisfactory wireless performance in conveying radio-frequency signals through the front face of device 10, device 10 may include an antenna 40 having an indirectly fed antenna arm 56 (FIG. 5) formed from conductive material in display module 62. FIG. 7 is an interior top view of device 10 (e.g., as viewed in the direction of arrow 78 of FIG. 6) showing one example of how device 10 may include an antenna 40 with an indirectly fed antenna arm 56 formed from conductive material in display module 62. In the example of FIG. 7, display cover layer 64 of FIG. 6 has been omitted for the sake of clarity.

As shown in FIG. 7, peripheral conductive housing structures may extend around the lateral periphery of device 10. Display module 62 may extend from the left edge to the right edge of device 10 and from the top edge to the bottom edge of device 10 (e.g., maximizing the active area of the display). A layer of conductive material such as conductive layer 82 may be layered onto the bottom surface of display module 62. Conductive layer 82 may include conductive tape (e.g., copper tape or another type of conductive tape having at least one adhesive side), sheet metal, conductive foil, or any other desired conductive layer.

Device 10 may include a conductive interconnect structure 72 overlapping conductive layer 82, display module 62, and conductive wall 68 (FIG. 6). If desired, conductive interconnect structure 72 may contact conductive layer 82 and conductive wall 68. Conductive interconnect structure 72 may electrically couple or short conductive layer 82 to conductive wall 68. Conductive layer 82 may be separated from conductive material in display module 62 by one or more dielectric layers in display module 62. This may establish a capacitive coupling between the conductive material in display module 62 and conductive layer 82 across the one or more dielectric layers. The capacitive coupling may form a short circuit path between the conductive material in display module 62 and conductive wall 68 (e.g., a short circuit path to ground) at radio frequencies. Conductive interconnect structure 72 may, if desired, extend across some or all (e.g., substantially all) of the width of device 10 (e.g., parallel to the X-axis).

The conductive material in display panel 52 that is laterally interposed between conductive interconnect structure 72 and the top edge of device 10 may form an antenna arm 56 for antenna 40 (e.g., the length L of antenna arm 56 may be defined as the lateral distance between conductive interconnect structure 72 and the upper edge of display module 62). Conductive interconnect structure 72 may form a return path 54 for antenna 40. The feed patch 58 for antenna 40 may overlap display module 62 (e.g., may be vertically interposed between display module 62 and conductive wall 68 of FIG. 6). Feed patch 58 may be laterally separated from conductive layer 82.

Feed patch 58 may be vertically separated from conductive material in display module 62 by one or more dielectric layers in display module 62. This may establish a capacitive coupling (e.g., near-field electromagnetic coupling 60 of FIG. 5) between the conductive material in display module 62 and feed patch 58 across the one or more dielectric layers. The capacitive coupling may allow feed patch 58 to indirectly feed antenna arm 56 (e.g., the conductive material in display module 62). Feed patch 58 may, for example, induce a corresponding antenna current to flow around the perimeter of antenna arm 56 (e.g., display module 62), as shown by arrows 80. Conductive interconnect structure 72 may form a short circuit path (e.g., return path 54) for the antenna current between antenna arm 56 and conductive wall 68 (e.g., antenna ground 49 of FIG. 3).

The dimensions of feed patch 58 (e.g., length 83 and/or width 81) and/or the placement of conductive interconnect structure 72 (e.g., length L of antenna arm 56) may be selected to tune the capacitive coupling between feed patch 58 and display module 62, to perform impedance matching for antenna 40, and/or to tune the frequency response of antenna 40. If desired, feed patch 58 may also cause antenna current to flow along the portion of display module 62 that is interposed between conductive interconnect structure 72 and the lower edge of device 10 (e.g., forming an additional antenna arm 56' for antenna 40).

Figure 8:
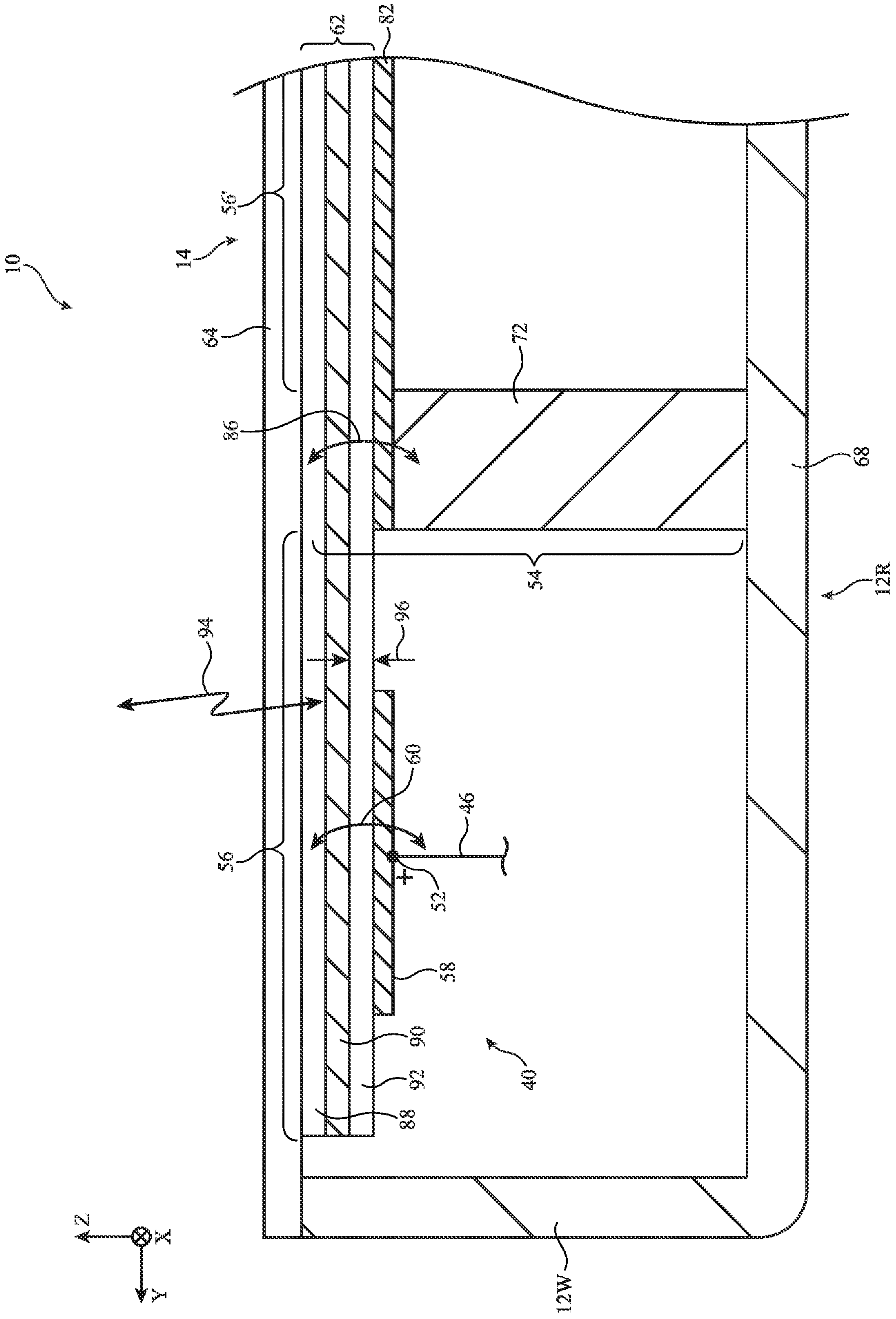
FIG. 8 is a cross-sectional side view of an illustrative electronic device having a capacitively fed display antenna in accordance with some embodiments.

FIG. 8 is a cross-sectional side view showing how feed patch 58 may indirectly feed an antenna arm 56 formed from conductive material in display module 62 (e.g., as taken along line AA' of FIG. 7). In the example of FIG. 8, peripheral conductive housing structures 12W and conductive wall 68 are illustrated as different respective portions of a single integral piece of metal (e.g., in a unibody configuration for device 10). This is illustrative and, if desired, conductive wall 68 and peripheral conductive housing structures 12W may be formed from separate conductors. If desired, device 10 may include a slot 70 (FIG. 6) between peripheral conductive housing structures 12W and conductive wall 68.

As shown in FIG. 8, display module 62 may include multiple vertically stacked layers. The stacked layers of display module 62 may include one or more dielectric layers such as dielectric layer(s) 92, one or more conductive layers such as conductive layer(s) 90 stacked onto dielectric layer (s) 92, and one or more additional dielectric layers such as dielectric layer(s) 88 stacked onto conductive layer(s) 90. Dielectric layer(s) 88 may be vertically interposed between conductive layer(s) 90 and display cover layer 64. Conductive layer(s) 90 may be vertically interposed between dielectric layer(s) 88 and dielectric layer(s) 88.

Dielectric layer(s) 92 may include one or more layers such as a glass or plastic substrate layer, an adhesive layer (e.g., a layer of optically clear adhesive (OCA)), an optical polarizer layer, and/or other dielectric layers. Conductive layer(s) 90 may include pixel circuitry for display 14, touch sensor circuitry for display 14 (e.g., touch sensor electrodes), force sensor circuitry, one or more layers of thin film transistors (TFTs) and/or transparent conductive material such as indium tin oxide (ITO) (e.g., as used in touch sensor and/or pixel circuitry in display 14), one or more layers of conductive ground traces, and/or other conductive layers in display module 62. If desired, display panel 62 may include one or more additional dielectric layers interposed and/or interleaved between multiple conductive layers 90. The multiple conductive layers may be electrically coupled together using conductive vias extending through the additional dielectric layer(s) and/or via capacitive coupling across the additional dielectric layer(s). Dielectric layer(s) 88 may include or more layers such as adhesive layers (e.g., OCA layers), an optical polarizer layer, and/or other dielectric layers. Conductive layer(s) 90 are sometimes also referred to herein as conductive display structures 90 or display conductors 90.

Adhesive in dielectric layer(s) 88 may help to secure, bond, affix, or attach display module 62 to the interior surface of display cover layer 64. Dielectric layer(s) 92 may have a first surface that contacts conductive layer(s) 90 and may have an opposing second surface facing rear housing wall 12R. Feed patch 58 may be layered onto the second surface of dielectric layer(s) 92. Feed patch 58 may be formed from a piece of conductive tape (e.g., copper tape) that is attached to the second surface of dielectric layer(s) 92 or may be formed from another conductor (e.g., a metal patch, metal foil, a sheet metal member, etc.) that is pressed against and/or attached to the second surface of dielectric layer(s) 92 (e.g., by a layer of adhesive in dielectric layer(s) 92 or an additional layer of adhesive).

Conductive layer 82 may also be layered onto the second surface of dielectric layer(s) 92. Conductive layer 82 may be formed from a piece of conductive tape (e.g., copper tape) that is attached to the second surface of dielectric layer(s) 92 or may be formed from another conductor (e.g., a metal patch, metal foil, a sheet metal member, etc.) that is pressed against and/or attached to the second surface of dielectric layer(s) 92 (e.g., by a layer of adhesive in dielectric layer(s) 92 or an additional layer of adhesive). Conductive layer 82 may, for example, be coplanar with feed patch 58.

Dielectric layer(s) 92 may form one or more insulator layers that vertically separate feed patch 58 and conductive layer 82 from conductive layer(s) 90. This may establish a first capacitance and a first capacitive coupling between feed patch 58 and conductive layer(s) 90 (e.g., near-field electromagnetic coupling 60) and may establish a second capacitance and a second capacitive coupling between conductive layer 82 and conductive layer(s) 90 (e.g., near-field electromagnetic coupling 86). Dielectric layer(s) 92 have an overall thickness 96 that may be selected to tune the first and/or second capacitances. Conductive interconnect structure 72 may extend from conductive layer 82 to conductive wall 68 and may electrically short conductive layer 82 to conductive wall 68 (e.g., within an interior cavity of device 10 that is surrounded by peripheral conductive housing structures 12W and rear housing wall 12R). The portion of conductive layer(s) 90 laterally interposed between conductive interconnect structure 72 and peripheral conductive housing structures 12W may form antenna arm 56 of antenna 40. Conductive interconnect structure 72 may form return path 54 of antenna 40. If desired, the portion of conductive layer(s) 90 to the right of conductive interconnect structure 72 may form an additional antenna arm 56' of antenna 40.

During operation, antenna 40 may convey radio-frequency signals 94 through display cover layer 64. Corresponding antenna current may flow along the lateral edges of conductive layer(s) 90 (e.g., as shown by arrows 80 of FIG. 7). Feed patch 58 may indirectly feed antenna arm 56 and conductive layer(s) 90 across dielectric layer(s) 92 via near-field electromagnetic coupling 60 (e.g., the capacitive coupling between conductive layer(s) 90 and feed patch 58 may form a short circuit path or another path having less than a threshold impedance for antenna current at radio frequencies while forming an open circuit or another path having greater than a threshold impedance at lower frequencies). Antenna current may also flow between conductive layer(s) 90 and conductive layer 82 via near-field electromagnetic coupling 86 across dielectric layer(s) 92 (e.g., the capacitive coupling between conductive layer(s) 90 and conductive layer 82 may form a short circuit path or another path having less than a threshold impedance for antenna current at radio frequencies while forming an open circuit or another path having greater than a threshold impedance at lower frequencies). Conductive interconnect structure 72 may convey the antenna current between conductive wall 68 and conductive layer 82 (e.g., conductive wall 68 may form part of the antenna ground for antenna 40). In this way, antenna 40 may be integrated into display module 62 and device 10 while allowing display module 62 to exhibit as large an active area as possible and while allowing antenna 40 to exhibit a satisfactory level of efficiency and/or bandwidth in conveying radio-frequency signals 94 through display cover layer 64. When integrated into display module 62 in this way, antenna 40 is sometimes also referred to herein as an indirectly fed display antenna or a capacitively fed display antenna.

Figure 9:
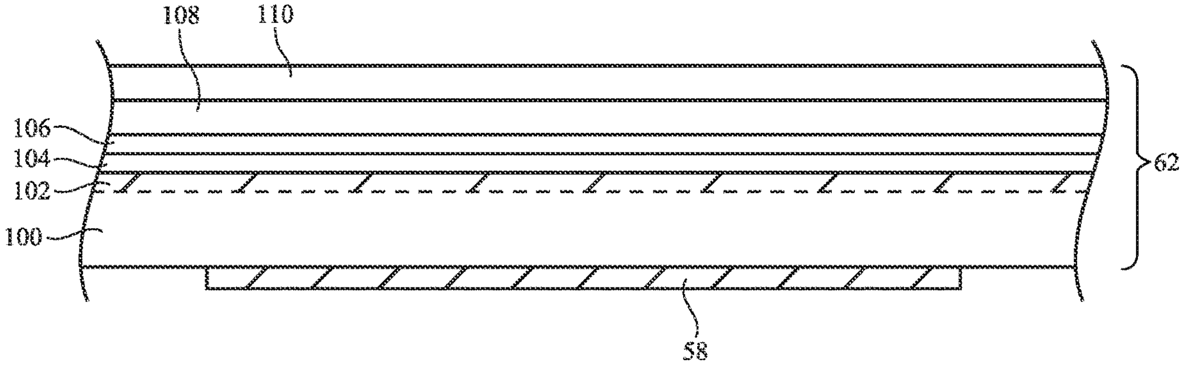
FIG. 9 is a cross-sectional side view of an illustrative display panel having a conductive layer that is used to form part of a capacitively fed display antenna in accordance with some embodiments.

In general, display module 62 may include any desired stack of display layers. FIG. 9 is a cross-sectional side view showing one example of a stack of display layers that may be included in display module 62. As shown in FIG. 9, display module 62 may include a substrate layer such as substrate 100. Substrate 100 may be formed from glass or plastic, as two examples. Substrate 100 has a first lateral surface facing away from feed patch 58 and has a second lateral surface facing feed patch 58. Feed patch 58 may be layered onto the second lateral surface of glass substrate 100.

Display module 62 may include a TFT layer 102 that is patterned onto the first lateral surface of substrate 100. In this example, TFT layer 102 forms conductive layer(s) 90 of FIG. 8 and substrate 100 forms dielectric layer(s) 92 of FIG. 8. Substrate 100 serves as an insulating layer between TFT layer 102 and feed patch 58.

Display module 62 may also include an encapsulation layer 104 on TFT layer 102, an adhesive layer 106 (e.g., a layer of OCA) on encapsulation layer 104, an optical polarizer layer 108 on adhesive layer 106, and an adhesive layer 110 on optical polarizer layer 108 (e.g., a layer of OCA that adheres display module 62 to display cover layer 64 of FIG. 8). In this example, layers 104-110 form dielectric layer(s) 88 of FIG. 8.

TFT layer 102 may include TFTs and/or other optically transparent conductors (e.g., ITO traces) that form display pixel circuitry for display module 62 (e.g., for emitting light through display cover layer 64) and/or touch sensor circuitry for display module 62 (e.g., for receiving touch inputs through display cover layer 64). Omitting conductive material such as ITO traces between TFT layer 102 and display cover layer 64 may help to minimize the thickness of display module 62 while allowing antenna 40 to convey radio-frequency signals through the display cover layer without being blocked by conductive material between TFT layer 102 and the display cover layer.

The example of FIG. 9 is illustrative and non-limiting. If desired, dielectric layer(s) 88 of FIG. 8 may include additional layers, display module 62 may include one or more ITO layers (e.g., double ITO (DITO) layers and/or single ITO (SITO) layers) interleaved with the additional layers and/or display module 62 may include any other desired dielectric and/or conductive layers. Some or all of the conductive layers in display module 62 may form part of antenna arm 56. In general, pixel circuitry in TFT layer 102 may include pixels having any desired architecture (e.g., light emitting diode (LED) pixels, organic light emitting diode (OLED) pixels, etc.).

Figure 10:
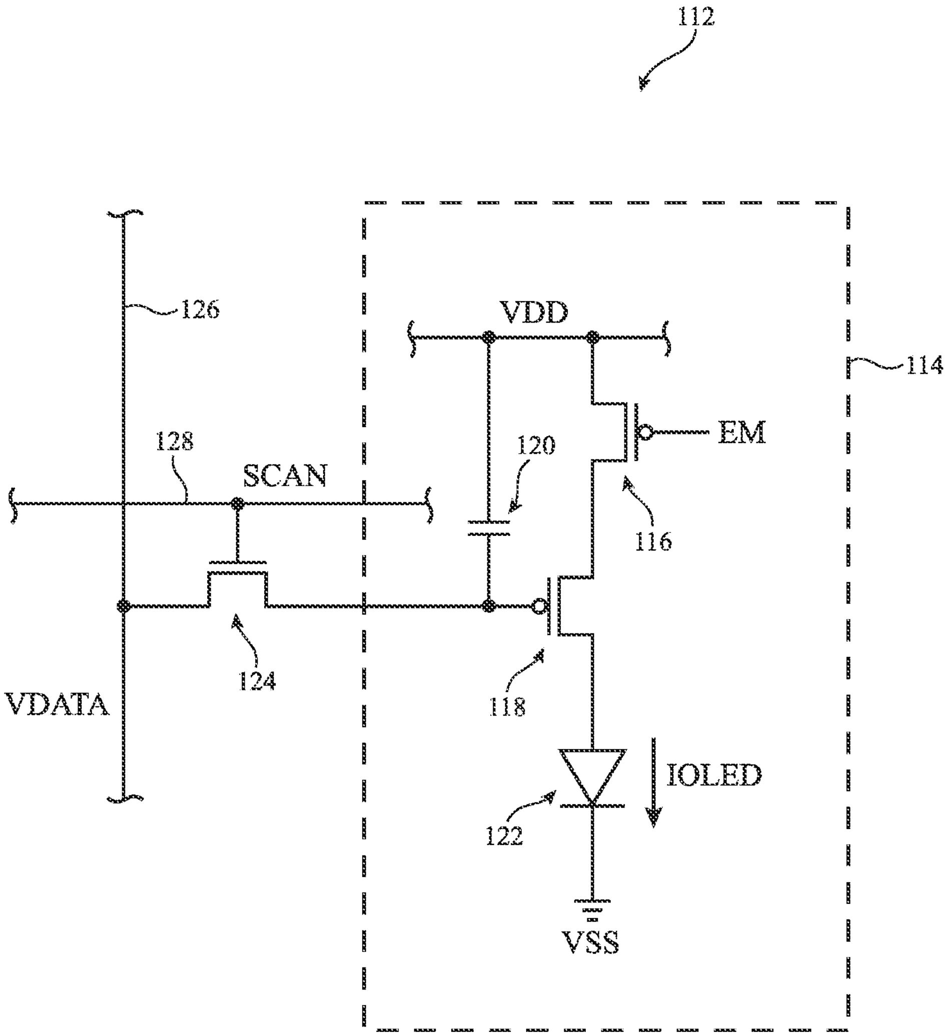
FIG. 10 is a circuit diagram of an illustrative display pixel that may be used to form part of a capacitively fed display antenna in accordance with some embodiments.

FIG. 10 is a circuit diagram of an illustrative pixel 112 that may be formed in TFT layer 102 of FIG. 9 and/or conductive layer(s) 90 of FIG. 8. In the example of FIG. 10, pixel 112 is an OLED pixel having an OLED 122 that emits light when driven using current IOLED. This example is illustrative and, in general, pixel 112 may have any desired display pixel architecture.

As shown in FIG. 10, pixel 112 may include a data line 126 that carries pixel data (VDATA), a scan line 128 that carries a scan signal (SCAN), and a scan transistor 124 having a gate terminal driven by scan line 128 and having a first source/drain terminal coupled to data line 126. Pixel 112 may also include a drive transistor 118 having a gate terminal coupled to a second source/drain terminal of scan transistor 124 and coupled to power supply voltage VDD through capacitor 120. OLED 122 may be coupled in series between a first source/drain terminal of drive transistor 118 and reference voltage VSS. Pixel 112 may include an emission transistor 116 having a gate terminal driven by pulses in emission signal EM, having a first source/drain terminal coupled to the second source/drain terminal of drive transistor 118, and having a second source/drain terminal coupled to power supply voltage VDD. In this example, portion 114 of pixel 112 (e.g., transistor 116, transistor 118, OLED 122, capacitor 120, and/or conductive lines coupling these components together and/or to scan transistor 124) may carry radio-frequency antenna current and may form part of the antenna arm 56 of antenna 40 (e.g., may form part of conductive layer(s) 90 of FIG. 8 and/or TFT layer 102 of FIG. 9). This example is illustrative and, in general, pixel 112 may have any desired architecture and any desired components in pixel 112 may form part of antenna arm 56.

As used herein, the term “concurrent” means at least partially overlapping in time. In other words, first and second events are referred to herein as being “concurrent” with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term “while” is synonymous with “concurrent.”

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:
- a conductive wall;
- peripheral conductive housing structures;
- a display cover layer mounted to the peripheral conductive housing structures opposite the conductive wall;
- a display panel mounted to the display cover layer and configured to emit light through the display cover layer, the display panel including a dielectric layer and a first conductive layer on the dielectric layer; and
- an antenna that includes
  - an antenna arm formed from the first conductive layer and configured to radiate through the display cover layer,
  - a feed patch layered onto the dielectric layer and configured to indirectly feed the first conductive layer,
  - a second conductive layer layered onto the dielectric layer, and
  - a conductive interconnect that couples the second conductive layer to the conductive wall.

2. The electronic device of claim 1, wherein the dielectric layer has a first lateral surface that contacts the first conductive layer, the dielectric layer has a second lateral surface opposite the first lateral surface, the feed patch is disposed on the second lateral surface, and the second conductive layer is disposed on the second lateral surface.

3. The electronic device of claim 2, wherein the first conductive layer comprises a thin film transistor (TFT) layer and the dielectric layer comprises a substrate for the TFT layer.

4. The electronic device of claim 3, wherein the display comprises:
- an encapsulation layer on the TFT layer;
- a first optically clear adhesive (OCA) layer on the encapsulation layer;
- an optical polarizer layer on the first OCA layer; and
- a second OCA layer on the optical polarizer layer, the second OCA layer being configured to adhere the display panel to the display cover layer.

5. The electronic device of claim 3, wherein the TFT layer comprises display pixels configured to emit the light.

6. The electronic device of claim 5, wherein the display pixels comprise organic light emitting diode (OLED) pixels.

7. The electronic device of claim 3, wherein the TFT layer comprises touch sensor electrodes.

8. The electronic device of claim 1, wherein the feed patch is configured to generate an antenna current on the first conductive layer via a first near-field electromagnetic coupling across the dielectric layer, the second conductive layer being configured to receive the antenna current from the first conductive layer via a second near-field electromagnetic coupling between the first and second conductive layers and being configured to short the antenna current to the conductive wall through the conductive interconnect.

9. The electronic device of claim 1, wherein the second conductive layer comprises conductive tape.

10. The electronic device of claim 1, wherein the feed patch comprises conductive tape.

11. The electronic device of claim 1, further comprising:
- a radio-frequency transmission line having a signal conductor coupled to the feed patch.

12. The electronic device of claim 1, wherein the first conductive layer comprises organic light emitting diode (OLED) pixels with thin film transistors (TFTs) that form part of the antenna arm.

13. The electronic device of claim 1, wherein the first conductive layer comprises a thin film transistor (TFT) layer, the feed patch is configured to produce a radio-frequency current on the TFT layer via a first capacitive coupling between the feed patch and the TFT layer, and the second conductive layer is configured to short, via a second capacitive coupling between the second conductive layer and the TFT layer, the radio-frequency current from the TFT layer onto the conductive wall through the conductive interconnect.

14. The electronic device of claim 13, wherein the feed patch is coplanar with the second conductive layer.

15. The electronic device of claim 13, wherein the feed patch comprises a first piece of conductive tape.

16. The electronic device of claim 15, wherein the second conductive layer comprises a second piece of conductive tape.

17. The electronic device of claim 13, wherein the TFT layer has a lateral periphery facing the peripheral conductive housing structures, the radio-frequency current being configured to flow around the lateral periphery of the TFT layer.

18. The electronic device of claim 1, wherein the antenna further includes an antenna ground, the antenna ground including the conductive wall and at least some of the peripheral conductive housing structures.

19. The electronic device of claim 18, wherein the first conductive layer comprises organic light emitting diode (OLED) pixel circuitry.

20. The electronic device of claim 19, wherein the antenna further includes a positive antenna feed terminal on the feed patch.

* * * * *